Dec. 4, 1962 H. G. MÖLLER ETAL 3,067,416
PRODUCTION OF PICTURES OF TRUE PATHS OF MOTION
FROM INSTANTANEOUS PICTURES FROM A VEHICLE
OR VESSEL BY PULSE REFLECTION
Filed Nov. 20, 1957 3 Sheets-Sheet 2
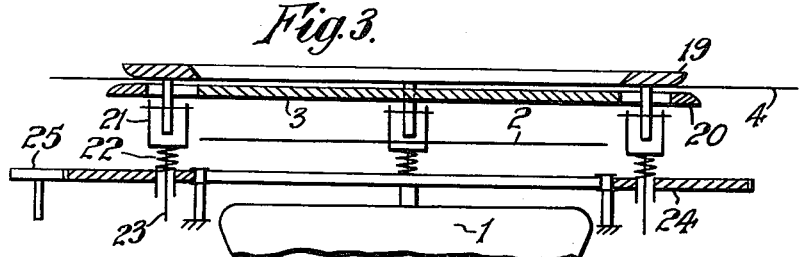
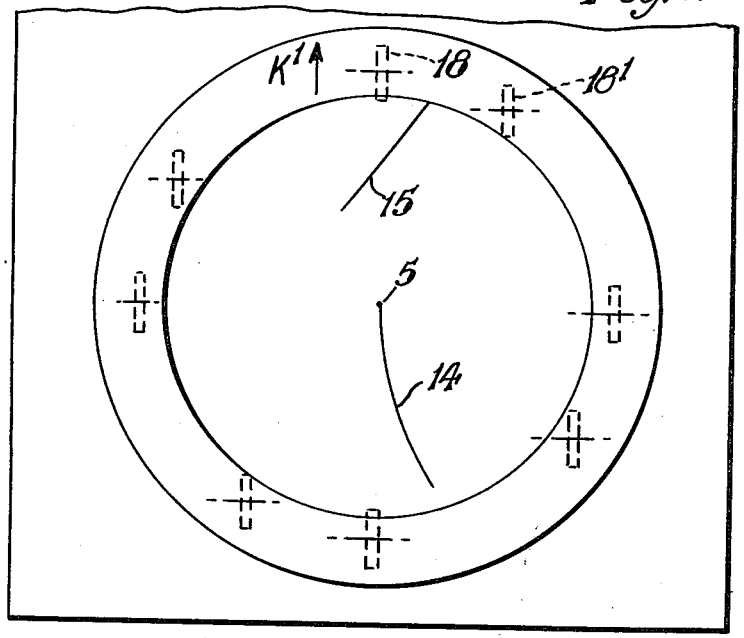
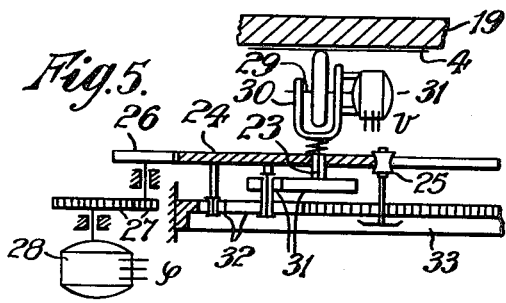
INVENTORS
HANS GEORG MÖLLER
FREDRICH WILHELM KALLMEYER
by Ezekiel Wolf
their attorney

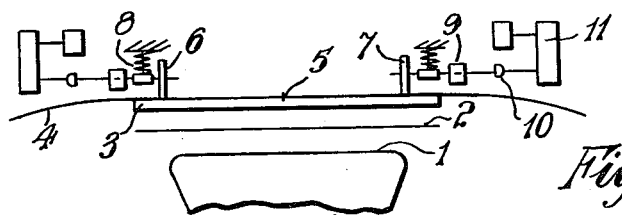
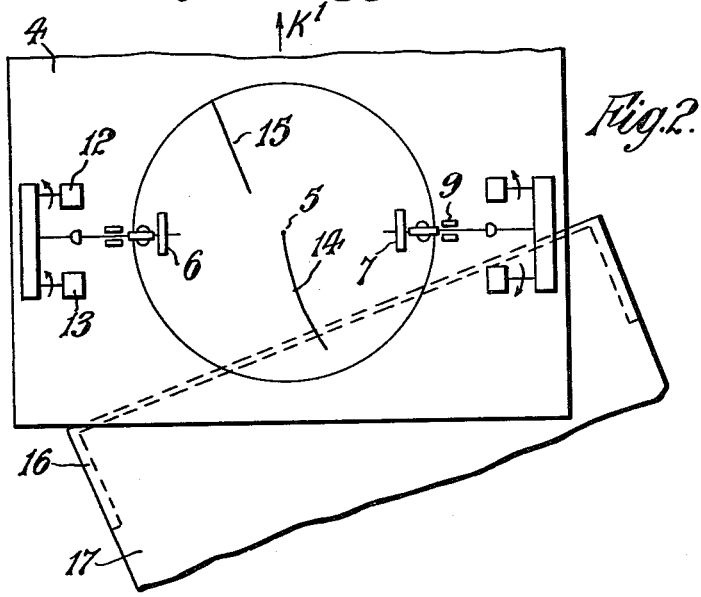
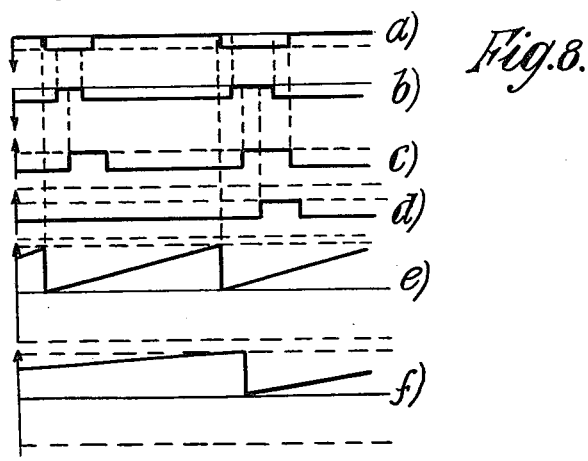

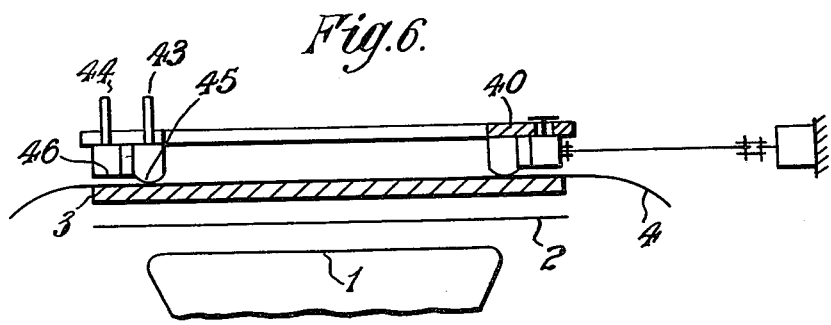
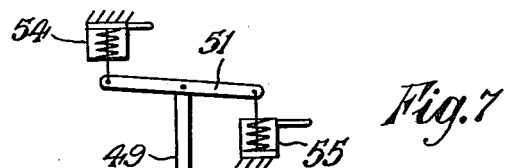
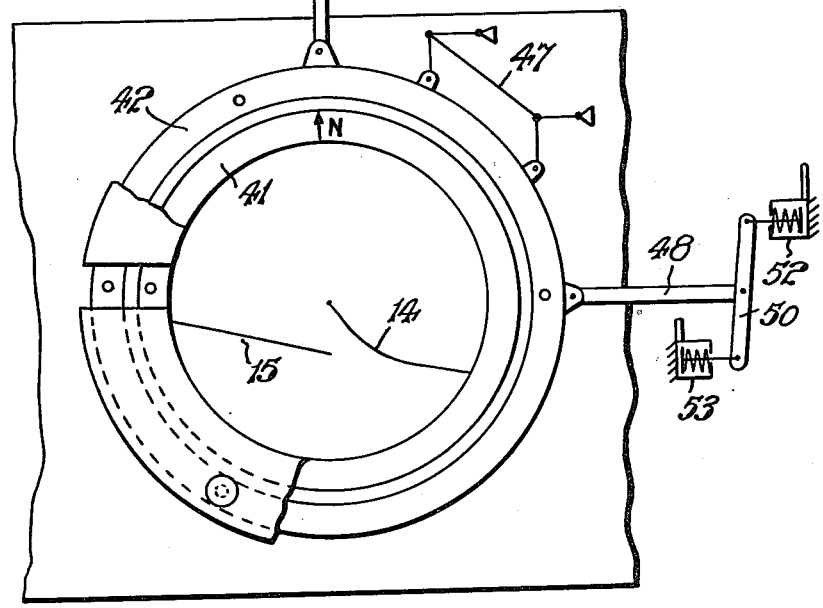

3,067,416
PRODUCTION OF PICTURES OF TRUE PATHS OF MOTION FROM INSTANTANEOUS PICTURES FROM A VEHICLE OR VESSEL BY PULSE REFLECTION
Hans Georg Möller, 4 Glindersweg, Hamburg-Bergedorf, Germany, and Friedrich Wilhelm Kallmeyer, 38 Manteuffelstrasse, Bremen, Germany
Filed Nov. 20, 1957, Ser. No. 697,720
Claims priority, application Germany Nov. 29, 1956
14 Claims. (Cl. 343—5)

This invention relates to the production of pictures of true paths of motion from instantaneous pictures from a vehicle or vessel by pulse reflection and is an improvement on or modification of the invention described and claimed in our copending application entitled Radar Set, Serial No. 622,684, filed November 16, 1956.

The aforesaid copending application relates to the production of pictures of the position and paths of motion of objects. Instantaneous pictures of the position of these objects with respect to the observing vehicle or vessel, obtained at different times by the pulse reflection method from such vehicle or vessel in motion, are recorded on a recording surface with the position of the moving objects and the observing vehicle or vessel on the recording surface displaced in accordance with the progress of the observing vehicle or vessel in a stationary reference system. By taking into account the distance scale and azimuth orientation of the instantaneous pictures, an accurate pictorial representation of the courses and speeds of the observing vessel and adjacent objects is displayed to enable the observing vessel to maneuver in ample time to avoid the danger of collision. The picture of the observing vehicle or vessel and the related changing instantaneous pictures are moved relative to a recording surface. Under these circumstances the edge of the recording surface is eventually reached and the picture of the observing vehicle or vessel must be moved back on the recording surface. As a result, a superposition of two pictures of paths of motion occur at least temporarily if the old picture cannot be instantaneously erased. In addition, the connection with the existing picture of the paths of motion are lost, so that there must be a relatively long waiting period before sufficiently long portions of paths of motion are recorded in the new picture to permit recognition of the directions of motion.

The present invention aims at obviating the foregoing disadvantage. To this end, it includes recording the instantaneous pictures on individual sheets which are displaced in relation to the spatially fixed picture of the observing vehicle or vessel in the instantaneous pictures in accordance with the progress of the ship. If desired, the course-oriented picture of paths of motion may be similarly displaced about the location of the picture of the observing vehicle or vessel. Under these circumstances, when the instantaneous pictures reach the edge of the sheet on which the recording is made, another sheet can be added to the first to create a continuous recording surface.

The following explanation relating to the orientation of the pictures will be given first. A position picture is designated north-oriented when the north direction in the picture constantly coincides with the picture axis B extending vertically from bottom to top with respect to the observer at the place provided for the latter. In the production of a north-oriented picture of paths of motion from the fitting together of instantaneous pictures, the instantaneous pictures must also all be north-oriented. The recording surface is in this case displaced in its plane opposite to the course direction of the observing ship as transferred to the picture, in accordance with the speed of travel. In a course-oriented picture, the direction of travel of the observing ship as transferred to the picture is made constantly to coincide with the picture axis by turning the recording surface about the location of the observing ship. In order to insert new instantaneous pictures of the position of objects in the surroundings for updating an existing course-oriented picture of paths of motion, the instantaneous pictures must also be course-oriented. The recording surface in the case of course-oriented recording is displaced relative to the fixed location representative of the observing ship directly opposite to the course of the observing ship location in the picture in accordance with the speed of travel; that is, opposed to the direction of the picture axis. By turning the entire arrangement in accordance with the changes of course of the observing vehicle or vessel, an apparatus intended for the production of a course-oriented picture of paths of motion can be converted into an apparatus supplying a north-oriented picture, and vice-versa. In applying this principle practically, the required reorientations may be effected by means associated with the deflection means on a cathode ray tube displaying the instantaneous pictures, or the apparatus for displacing the recording surface in accordance with the progress of the observing vehicle or vessel.

The instantaneous pictures can be produced on the screen of a cathode ray tube of a conventional radar system, and can be made to coincide optically on a screen by projection means including a drawing prism, or by viewing through a transparent recording sheet disposed above the luminous cathode ray tube screen. In the latter case, this may be advantageously accomplished with the interpositioning of a semi-transparent plotter mirror. The instantaneous pictures may be recorded manually, photographically, or by a photo-electric printing method using an ink powder deposited upon charged portions of the recording surface. In combination with devices for horizontal echo sounding using water sonics, the instantaneous pictures can also be recorded by a recorder having a moving stylus. As in the case of echoes displayed on the screen of a radar picture tube, the echoes must always be recorded in the direction of the echo reception as transferred to the picture and at a distance, corresponding to the echo distance, from the displayed stationary location of the picture of the observing ship. This invention is not limited to the conventional radar search method in which transmission and reception take place in the same direction. For example, sound pulses can be emitted and received at a constant angle to the direction of travel by means of an emitter mounted fast upon the ship and sharply directed at least in the horizontal plane. Alternatively, a uniformly emitting directional transmitter and a directional receiver having a constant angle difference for the reception direction with respect to the transmission can be rotated to search a circular zone concentric about the ship. Apparatus for producing an instantaneous picture of the position of objects in their surroundings by various methods are known. The present invention is concerned with joining together the instantaneous pictures according to the progress of the observing vehicle or vessel wherein a spatially fixed location of the observing vessel picture and the instantaneous pictures is shown on an automatically displaced interchangeable recording sheet. In the radar method the picture of the observing ship, on a P.P.I. display always appears at the center of the screen, corresponding to the distance zero. For the displacement of the recording sheet in accordance with the progress of the observing vehicle or vessel, the same distance scale is used as in the instantaneous pictures for the radial distance between the observing ship and the objects indicated.

Various methods are known for recording a picture of paths of motion from the instantaneous pictures of a radar system, taking into account the travel of the observing vehicle or vessel. However, these methods require a great deal of time and the careful attention of the observer. This is avoided in the method according to the invention by automatically displacing the recording sheet in accordance with the speed of travel of the observing vessel as measured by a log and in accordance with the compass indication of the course.

In the apparatuses according to the invention, consideration is preferably given to an arrangement in which a transparent recording sheet, consisting of cellone for example, is displaced over a glass plate disposed parallel to the picture screen of a radar device for example and at a small distance therefrom, or together with such a plate. The conventional floodlight illumination of the plotter disc is in this case inoperative owing to the absence of an optical contact between the recording sheet and the disc. Attention must therefore be paid to another suitable illumination with glancing light incidence by which the picture screen is not brightened, it being possible in known manner to select the spectral composition of the illuminating light to differ from that of the screen picture. It is also possible to make use of the advantage of a floodlight illumination by introducing a contact liquid between the recording sheet and the supporting glass plate. Illumination with polarised light may also be provided.

The cited copending application already describes an apparatus for displacing a plate in accordance with the progress of the observing vehicle or vessel by means of a pair of differential wheels. Other devices of this kind are also described. An apparatus according to the invention, may for example, be constructed by detachably connecting the sheet to be recorded to a support, for example in the form of a glass plate. This support is driven in accordance with the progress of the observing vehicle or vessel. If desired, as in the case of the production of a course-oriented picture, the support is also rotated about the location of the picture of the observing vessel at any given time. If the instantaneous pictures reach the edge of the recording surface, the connection of the sheet to the support is broken. The sheet is simultaneously held fast in its position, for example by suction heads, pins or clips. The support is uncoupled from its drive, displaced in the direction of the instantaneous course so that the instantaneous picture now lies at the opposite edge of the picture surface, and a new sheet is placed on the support. After the old sheet has also been re-connected to the support, the latter is re-coupled to its drive and the recording of the instantaneous pictures is resumed in continuation of the old picture. Only when the paths of motion recorded on the old sheet are no longer useful, for example on the next insertion of a new sheet, will the old sheet be removed. The connection of the sheets to the support may be effected for example by annular suction heads, mechanical clapping devices or magnetic forces, in which latter case the recording sheets must have a coating of magnetisable material at least at the edge. It is also possible to mark the spatial position of the old sheet with respect to fixed mechanical or optical pointers before the application of a new sheet. Then, the support drive may be connected in the same position to the new sheet, for example by gluing. Moreover, parts of the paths of motion recorded on the old sheet and the position marks may be transferred to the new sheet, for example by tracing. After the new sheet has been placed on the support, the latter may be adjusted according to the position marks before being coupled to its drive. The diameter of a glass plate serving as support will be selected to be about one and a half to three times the diameter of the picture surface of the instantaneous pictures. The support may also take the form of only an annular holding device with a fixed circular plate inside of the size of the picture field of the instantaneous pictures as a support for the recording sheet. To facilitate operation a common control device can be provided for the fixed and movable recording sheet holding devices and the coupling of the drive of the support.

A cross slide arrangement is particularly suitable for displacing the support. This arrangement displaces the recording sheet in orthogonal directions, corresponding to orthogonal components of the direction of travel, supplied by a course computer, in the south-north and west-east direction. To produce a course-oriented picture the compound slide arrangement must be constructed to be rotatable about the location of the picture of the observing vehicle or vessel in accordance with the course at any given time. As support, use may be made of a plate which by means of friction wheels is displaced in accordance with the progress of the vehicle or vessel and which is if desired rotated. In each case the driving means will be so disposed that observation of the recording surface and recording on the same are not obstructed.

According to a further embodiment of the invention, the drive for the recording sheet lying on a smooth surface is effected by driving means not participating in its travel, so that no re-setting of a support is necessary and a new sheet can at all times be brought into engagement with the driving means.

In order that the invention may be more readily understood, reference is made to the accompanying drawings which illustrate diagrammatically and by way of example several embodiments thereof, and in which:

FIGURES 1 and 2 show respectively in elevation and plan an apparatus for producing a course-oriented picture of path lines by tracing of the instantaneous pictures of a radar device on a recording sheet rotated and displaced automatically in accordance with the progress of the observing vehicle or vessel above a glass plate by means of two friction wheels disposed on a diameter of the picture surface;

FIGURES 3 and 4 are respectively an elevation and plan of an apparatus for the same purpose with displacement and rotation of the recording sheet by means of four friction wheels disposed on a circle around the picture surface;

FIGURE 5 is a partial view of the same arrangement to clarify the adjustment of the friction wheels;

FIGURES 6 and 7 show an apparatus for producing a north-oriented picture of paths of motion by tracing the instantaneous pictures of a radar device on a recording sheet which is displaced in small movements in accordance with the progress of the observing vehicle or vessel by the cooperation of a fixed and a movable holding device; and FIGURE 8 shows diagrams to explain the cooperation of the parts of the apparatus shown in FIGURES 6 and 7.

In the embodiment shown in FIGURES 1 and 2 in order to produce a course-oriented picture of paths of motion the course-oriented instantaneous pictures to be traced on the recording sheet 4 sliding on a glass plate 3 and consisting of transparent foil are produced on the fluorescent screen 1 of a cathode ray tube. Reference numeral 2 denotes a plotter mirror which produces a mirror image of the recording surface coinciding with the screen 1. The shafts, movable in guides 9 and pressed down by springs 8, of the friction wheels 6 and 7 are driven through Cardan joints 10 and differential gears 11 by two servomotors 12, 13, in each case in the same directions in accordance with the speed of travel and in opposite directions in accordance with the variations of the course angle. If $v$ denotes the speed of travel, $\varphi$ the course angle, $t$ the time, $m$ the distance scale of representation, for example 1:100,000, and $r$ the radial distance of the friction wheels from the location of the picture of the observing vessel, situated at the centre of the picture surface 5, then the peripheral speeds of the left-hand and right-hand friction wheels respectively are:

$$u_6 = mv + r\frac{d\varphi}{dt}$$

$$u_7 = mv - r\frac{d\varphi}{dt}$$

The fixed arrow $K^1$ denotes the instantaneous course direction. The displacement of the sheet is opposed to the direction of the arrow. At 14 and 15 are the recorded lines of travel of the observing ship and of a neighboring ship. A previously used recording sheet 17 has practically entirely run out of the picture surface. It is still attached to the sheet 4 by an adhesive edge 16. The friction wheels 6 and 7 may also be provided with teeth or serrations at the periphery.

In the apparatus according to FIGURES 3 to 5, which likewise serves to produce a course-oriented picture of paths of motion, four friction wheels 18 are provided which are disposed on a circle and press the recording sheet 4 against the smooth underside of a ring 19. A bevelled edge of this ring and of a second ring 20 facilitate the introduction of new sheets. The shafts 29 of the friction wheels are mounted in stirrups 30 and are driven by servomotors 31 in accordance with the speed of travel $v$. The stirrups 30 are carried by shafts 23 by means of which they are mounted rotatably in a rotatable ring 24 mounted between rollers 25. Springs 22 press the friction wheels against the ring 19. By means of a gearwheel 26 and through a gear 27, the ring 24, toothed at the outer edge, is rotated about the point 5 by a servomotor 28 on changes of course, in a direction opposed to these changes. Under these circumstances the shafts 29 of the friction wheels 18 are constantly held vertical to the spatially fixed course direction in the picture $K'$. To this end the shafts 23 are driven on rotation of the ring 24 by way of gears 31', 32, the last wheel of which is in mesh with a fixed toothed rim 33. Reference 18' indicates the friction wheels in a position changed by rotation of the rim 24.

By means of apparatus (not shown), the friction wheels may be raised in pairs as desired for the purpose of introducing a new sheet. The sheets are advantageously coated on the underside with a thin non-sticking adhesive coating of hard wax or colophony in order to avoid mutual displacement of superimposed sheets. It may also be advantageous to increase the number of friction wheels. In the production of a north-oriented picture of paths of motion, the ring 24 is stationary and only the direction of the shafts 29 is adjusted according to the course angle.

The connection described hereinabove between a support for the recording sheet and fixed holding devices and holding devices movable with the support may be modified if the support performs only short movements which, given suitably alternating operation of the two holding devices, are added together for the recording sheet. On the return or idle stroke in each case the support frees the sheet which is then held by the fixed holding device. In this way the sheet can be made to travel and also turn in any desired direction. Since an apparatus of this kind functions as of an integrator, with suitable selection of the movement coordinates and by using suitable driving means, it is possible directly to use the speed of travel, measured with the log, in combination with the course angle, to control the displacement of the sheet.

An apparatus working on the principle indicated for producing a north-oriented picture is illustrated in FIGURES 6 and 7. The fixed and the movable holding device for the sheet 4 each consist of a ring 41 and 42 each having a U-shaped cross-section closed at the underside by annular rubber diaphragms 45 and 46, respectively, disposed at a slight distance from the recording sheet. The ring 41 is mounted to be fixed; the ring 42 is mounted to be displaceable parallel to the recording surface, both on a fixed ring 40. Pipe-lines 43, 44 deliver the controlled supply of compressed air to the rings. When an excess pressure prevails in the interior of a ring, the rubber diaphragm arches outward and presses the recording sheet 4 against the smooth support 3, whereby the sheet is connected to the ring in question so as to be secure against displacement and follows any movements of the said ring. To release the sheet the compressed air is discharged from the ring in question. The movable ring 42 is guided parallel to itself by a pair of articulated parallelograms 47 and can be displaced a certain distance in one or other direction by means of two push rods 48, 49. These rods are aligned along two orthogonal directions corresponding to the west-east and south-north direction in the picture. The push rods 48, 49 are driven through a balancing lever 50 and 51 respectively by compressed air cylinders with slidable pistons 52, 53 and 54, 55 respectively, which have separate connecting lines for the controlled filling and emptying of the cylinders. When the cylinders are empty, the pistons are returned into an end position by springs. The two driving units of a pair of cylinders 52, 53 and 54, 55 respectively serve to produce contradirectional displacements, which are all of equal value.

To initiate the displacements in accordance with the progress of the vehicle or vessel, a course computer (not shown) supplies two rotations proportional to the components of the speed of travel in the west-east and south-north directions, respectively. Each of the two shafts of the course computer drives a control arm through a disengageable coupling, and when a certain angle of rotation is exceeded in one or other direction said control arm effects a brief disengagement of the coupling and is at the same time returned to its middle position by springs. In FIGURES 8(e) and (f) movements of the two control arms are illustrated by way of example. Simultaneously with the return of one control arm one of four rotary valves is set in motion in accordance with the preceding rotation of one or other control arm in one or other direction, and said rotary valve rotates once and then steps in its initial position. Each of said rotary valves controls the supply of compressed air to the two rings 41, 42 and the four cylinders 52, 53, 54, 55 in such manner that the sheet 4 is displaced in a determined direction in a determined sense through a distance which, by amount, is of equal value in all cases. The control is effected in particular in such manner that the release time of the fixed ring lies within the holding time of the movable ring and the effective stroke of the driving cylinder again takes place within the release time of the fixed ring, while the idle stroke does not take place until after completion of the holding time of the movable ring. By appropriate construction of the initiating device operated by the course computer, the time between two displacements at a normal speed of travel is made equal to about 3 to 10 seconds. In order to prevent any disturbances from occurring in the event of coincidence of two displacements in different directions, some of the control ports of the rotary valves controlling filling and emptying must be connected in series, so that the following relationships are obtained. As long as one of the rotary valves is set to holding by means of the movable ring, the release for this ring is blocked by the other rotary valve. If one of the rotary valves is on release for the fixed ring, holding for this ring is blocked by the other rotary valve. Finally, holding of the movable ring blocks the emptying of all the cylinders.

The diagrams 8a to 8d clearly show the sequence of the control processes, namely both for a single displacement and for the coincidence of two displacements. The curves $a$ and $b$ show the upward and downward movement of the rubber diaphragms of the movable and fixed rings respectively, $c$ and $d$ the sequence of effective and idle strokes of the movable ring for the two directions of displacement.

When the edge of a recording sheet situated in the apparatus approaches the edge of the picture surface, it is only necessary to push a new sheet beneath the outer movable ring which is then automatically gripped and displaced over the picture surface together with the old sheet. In the production of a course-oriented picture, the movable ring must also perform a rotation. Although in that case small rotations in the same directions could be allowed to follow one another, it appears advantageous to provide an oscillating rotary movement in this case too.

Change-over devices may be provided which permit alternation as desired between the production of a picture oriented according to course and a picture oriented according to a determined compass point.

We claim:

1. In association with a system for providing a picture of the position and paths of motion of objects by pulse reflection from a vehicle, apparatus comprising, a recording sheet for displaying said picture, said sheet being detachably secured for the duration of recording to a support, driving means for displacing said support in accordance with the progress of said vehicle whereby said support can be de-coupled from and re-coupled to said driving means in any desired displaced position, and means for holding fast the spatial position of a recorded sheet before releasing its connection with the support and the arbitrary adjustment of said support.

2. Apparatus according to claim 1, wherein the recording sheets are formed with at least an edge of magnetic material, and magnetic means on said support for detachably securing said recording sheets thereto.

3. Apparatus in accordance with claim 1 and further comprising, a cross slide system to displace said support in two directions at right angles to one another in accordance with the south-north and west-east components of the speed of travel of the vehicle or vessel, the cross slide system being mounted to rotate about the location of the picture of the observing vehicle.

4. Apparatus according to claim 1, wherein said support comprises a plate, driven in accordance with the direction and speed of travel of said vehicle to orient the picture of the paths of motion in a desired direction, said plate being driven by means of at least two friction wheels which are disposed at the edge of the picture surface and on the underside of the plate arranged symmetrically with respect to the picture of the observing vehicle, and means for selectively displacing said wheels in a direction normal to said plate to control contact between said plate and wheels.

5. Apparatus according to claim 1, wherein only the recording sheet is displaced on said plate, in accordance with the progress of the observing vehicle, means for rotating said sheet about the location of the picture of said vehicle in accordance with the changes of course of said vehicle, said means for rotating including driving means acting on the sheet and not travelling with the displacement of said sheet, and means for selectively engaging said driving means with said sheet whereby at any time without removal of the sheet that has just been recorded a new sheet can be brought into engagement with the driving means, and then be displaced together with the sheet just recorded in accordance with the progress of the vehicle or vessel.

6. Apparatus according to claim 5, wherein said means for rotating includes two friction wheels which are disposed at the edge of the picture surface symmetrically to the stationary picture of the observing vehicle or vessel and whose extended shafts, parallel to the plane of the sheet, pass through the vertical at the location of the picture of the observing vehicle or vessel, and which friction wheels are driven through two differential gears in the same directions in accordance with the speed of travel and in opposite directions in accordance with the turning speed of the vehicle or vessel on changes of course, while for the production of a course-oriented picture the line of the shafts remains stationary whereas for a north-oriented picture it is turned in accordance with any changes of course about the vertical at the location of the picture of the observing vehicle or vessel.

7. Apparatus according to claim 5 wherein said means for rotating includes at least four friction wheels which are disposed on a circle around the picture surface and adapted to be selectively raised in pairs and which are driven in accordance with the speed of travel of the vehicle or vessel, and which have shafts parallel to the picture surface and mounted in stirrups which stirrups are mounted in a ring, concentric to the location of the picture of the observing ship, so as to be rotatable about axes vertical to the picture surface and passing through the point of contact of the respective friction wheel with the recording sheet, and are rotated relatively to the ring jointly and in the same direction with the changes of course, the ring being stationary for the production of a north-oriented picture of paths of motion while for a course-oriented picture it is rotated in the opposite direction to the changes of course about the location of the picture of the observing vehicle or vessel.

8. Apparatus according to claim 5 and further comprising, a device for measuring the course and the value of the changes of course of the observing vehicle or vessel in conjunction with a control device by means of which the changes—which have taken place in consecutive short periods—of the path covered by the vehicle or vessel and of its course are converted into displacements, parallel to the picture surface, and, in the case of the production of a course-oriented picture, rotations of a movable member which is returned into a position of rest before each new displacement, controllable holding devices spatially fixed on the one hand and connected to the movable member on the other hand for holding or releasing the sheet, said holding devices on the one hand preventing unintentional displacements of the sheet in the picture surface and on the other hand selectively rendering a transmission of displacements and rotations of the movable member to the sheet, said fixed and movable holding devices being controlled in such association per unit of time with a displacement and rotation of the movable member and the return thereof as initiated by changes of the course of the observing vehicle that the small changes of the course are integrated by the resulting displacement of the sheet.

9. Apparatus according to claim 8, wherein the fixed and movable holding devices are disposed around the picture surface in the form of two concentric rings, the movable holding device being disposed in the outer ring.

10. Apparatus according to claim 5, wherein the recording sheets used have on one side a facing which ensures the joint displacement of overlapping sheets by high friction between the sheets.

11. A method for the production of a picture of the position and paths of motion of objects by pulse reflection from a vehicle in motion comprising, displaying instantaneous pictures of said objects relative to said vehicle on the screen of a cathode ray tube, projecting said displayed instantaneous pictures as visible pictures on a recording sheet to record said visible instantaneous pictures on said sheet by causing physical changes on the surface of said sheet, relatively displacing said recording sheet and said displayed instantaneous pictures in accordance with the course of said vehicle, and tracing said visible pictures to provide said position and paths of motion picture.

12. A device aboard a vehicle for continuously tracing the course of said vehicle on recording sheets sequentially fed into the device comprising, a circular platen centered about a fixed point for supporting a recording sheet fed into the device during its passage through said device, means concentrically disposed about said fixed point engaging said recording sheet by friction at at least two separate points and displaceable to produce relative motion between said fixed point and said recording sheet in correspondence with the relative movement of said vehicle and the surface of the earth, and means for marking the successive positions of said fixed point on said recording sheet to trace the path taken by said vehicle, said concentrically disposed means being arranged to leave free at least a major part of said platen and to accept another recording sheet in a position relative to a recording sheet already in the device to extend the recording surface in the direction ahead of said vehicle.

13. A device in accordance with claim 12 wherein said concentrically disposed means comprise friction wheels rotatable about axes parallel to each other and said platen and engaging recording sheets fed into the device for controlled movement of said recording sheets.

14. A device in accordance with claim 12 wherein said concentrically disposed means comprise reciprocated members and stationary members, and means for causing the latter members to alternately engage a recording sheet fed into the device to produce movement of the recording sheet in a desired direction.

References Cited in the file of this patent
UNITED STATES PATENTS

| | | |
|---|---|---|
| 442,925 | Tanner et al. | Dec. 16, 1890 |
| 2,418,490 | Turner | Apr. 8, 1947 |
| 2,586,743 | Thresher et al. | Feb. 19, 1952 |
| 2,621,555 | Fleming-Williams et al. | Dec. 16, 1952 |
| 2,649,781 | Clewell | Aug. 25, 1953 |